United States Patent Office 3,220,077
Patented Nov. 30, 1965

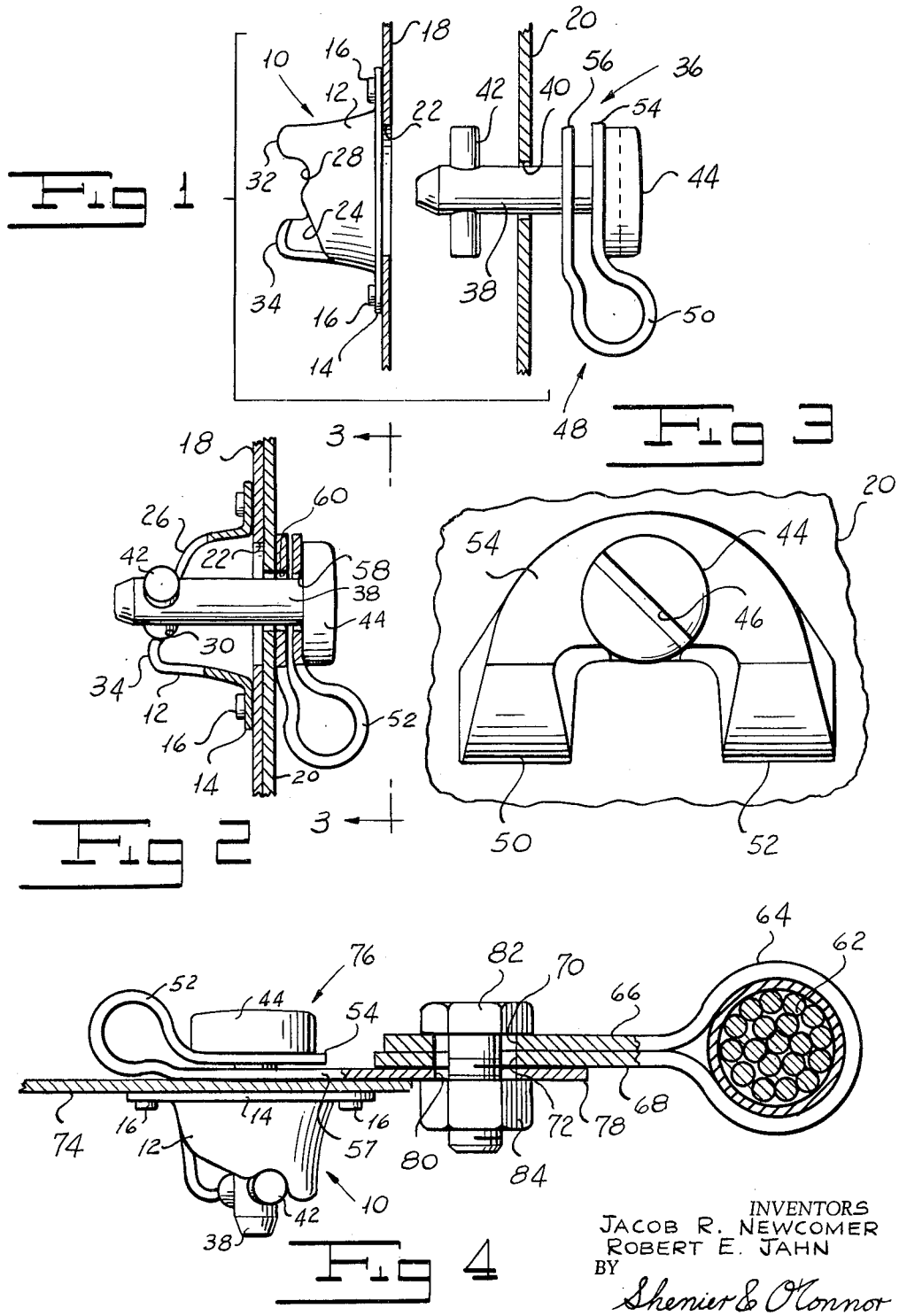

3,220,077
QUARTER-TURN FASTENER
Jacob R. Newcomer, Jr., Westwood, and Robert E. Jahn, West Englewood, N.J., assignors to Camloc Fastener Corporation, Paramus, N.J., a corporation of New York
Filed July 24, 1962, Ser. No. 211,987
3 Claims. (Cl. 24—221)

Our invention relates to a quarter-turn fastener and more particularly to an improved quarter-turn fastener which is extremely simple and which is less expensive to construct than are quarter-turn fasteners of the prior art.

One type of fastener which is widely used in the prior art is the quarter-turn or half-turn fastener. These fasteners are adapted to be used in any installation in which it is desired releasably, rapidly and expeditiously to secure two members in assembled relationship. These fastener assemblies of the prior art include a receptacle in the form of a hollow cylindrical or frustro-conicay body, one end of which is formed with cam tracks leading into pin-receiving recesses and provided with stops at the sides of the recesses remote from the terminal ends of the cam tracks. The fastener assembly which cooperates with the receptacle is carried by the other of two members to be secured to each other. This assembly comprises a shaft having a cross-pin at one end and provided with an actuator such as a notched head or a knob or the like at the other end. The shaft carries a coil spring disposed in a housing on the shaft. In the operating position of the fastener the spring bears between the base of the housing and the actuator. The end of the housing remote from the base carries a peripheral flange which engages the member carrying the fastener assembly.

In use of the quarter-turn fastener of the prior art described above, the shaft is passed through the receptacle body to position the cross-pin at the beginning of the respective cam tracks. From this position the shaft is rotated through a quarter-turn and the cross-pin rides up the cam tracks. The shaft is drawn inwardly against the action of the spring until the ends of the pin ride into the recesses at the tops or terminal ends of the cam tracks. In this position of the parts of the fastener the coil spring, which bears between the shaft actuator and the base of the housing whose flange engages the member carrying the fastener assembly, securely holds the cross-pin ends in the recesses. Stops are provided for preventing cross-pin ends from riding out of the recesses in response to an attempt to continue rotation of the shaft. If an attempt is made to rotate the shaft further the actuator engages a shoulder formed in the housing to prevent further axial movement of the shaft as the stops prevent continued rotary movement of the shaft.

There are many installations in which flexible tubing or cable is secured to a wall or the like in a given position. Clamps which are screwed into or are otherwise secured to the wall are employed to hold the cable in position and to determine the path of the cable from its origin to its terminus. It is often necessary to remove the hose or cable and then reinstall it, preferably at the same location following the same path. It will readily be appreciated that this is a tedious and time-consuming operation. In addition, great care must be taken to ensure that the cable or hose is made to follow the same path. We conceive an arrangement for using releasable fasteners for securing hose or cable to a wall employing quarter-turn fasteners, the receptacle locations of which would permit the hose or cable to be removed and reinstalled in a rapid and expeditious manner while ensuring that the cable follow the same path.

While quarter-turn fasteners of the type described above successfully accomplish their intended purpose of releasably holding two members in assembled relationship without employing a relatively large number of parts they are complicated, difficult and consequently expensive to manufacture. Moreover, having arrived at the concept of employing quarter-turn fasteners to secure hose or cable to a wall or the like, thus permitting its removal and reinstallation in a rapid and expeditious manner, we found that quarter-turn fasteners of the type known in the prior art were not readily adapted or adaptable to this use.

We have invented a quarter-turn fastener which overcomes the difficulties of all quarter-turn fasteners of the prior art. Our fastener employs fewer parts than do fasteners of the prior art. Our fastener is much simpler to construct and assemble than are fasteners of the prior art. It is less expensive to manufacture. Our fastener is readily adapted for use to secure a hose or cable to a wall while permitting its removal and reinstallation in a rapid and expeditious manner.

One object of our invention is to provide an improved quarter-turn fastener which overcomes the difficulties of quarter-turn fasteners of the prior art.

Another object of our invention is to provide a quarter-turn fastener which is simpler to construct and assemble than are quarter-turn fasteners of the prior art.

A further object of our invention is to provide an improved quarter-turn fastener which is less expensive than are quarter-turn fasteners of the prior art.

A still further object of our invention is to provide a quarter-turn fastener which is especially adapted for use in holding a hose or cable on a wall while permitting the ready removal and reinstallation of the hose or cable.

Other and further objects of our invention will appear in the following description.

In general our invention contemplates the provision of a quarter-turn fastener in which a shaft carrying a cross-pin is moved axially through a receptacle to position the cross-ends at the beginning of the receptacle cam tracks. As the shaft is rotated through approximately a quarter-turn the pin ends move up the cam tracks to draw the shaft inwardly against the action of a compound flat spring bearing between the shaft actuator and the member carrying the shaft. Ultimately, the pin ends ride into recesses in which they are resiliently held by the spring. Further rotation of the shaft is limited by stops adjacent the recesses and further axial movement of the shaft is limited by the presence of the two spring legs between the actuator and the member carrying the shaft. In use of the fastener to secure a cable or hose to a wall one of the spring legs is extended and secured to the cable clamp.

In the accompanying drawings which form part of the instant specification and which are to be read in conjunction therewith and in which like reference characters identify like parts in the various views:
FIGURE 1 is an elevation of our improved quarter-turn fastener showing the fastener assembly disassembled from the receptacle.
FIGURE 2 is a sectional view of our improved quarter-turn fastener showing the fastener assembly in the receptacle.
FIGURE 3 is a plan view of our improved quarter-turn fastener taken along the line 3—3 of FIGURE 2.
FIGURE 4 is an elevation of an alternate form of our improved quarter-turn fastener with parts shown in section.

Referring now to the drawings, the receptacle indicated generally by the reference character 10 with which our fastener is used includes a hollow, frustro-conical body 12 provided with a base 14 secured by any suitable means such as by rivets 16 to the first one 18 of two members 18 and 20 adapted to be releasably secured to each other. We so place the hollow body 12 on the member 18 that it is over an opening 22 in the member 18.

We form the end of the body 12 remote from the member 18 with respective cam tracks 24 and 26 provided by inwardly extending flanges. Tracks 24 and 26 lead into recesses 28 and 30 adapted to receive cross-pin ends to be described. We form stops 32 and 34 at the sides of the recesses 28 and 30 remote from the cam tracks 24 and 26.

The fastener assembly indicated generally by the reference character 36 of our improved quarter-turn fastener includes a shaft 38 loosely carried in an opening 40 in the member 20. One end of shaft 38 carries a cross-pin 42. We provide the other end of the shaft 38 with a suitable actuator such as a head 44 provided with a slot 46 for the reception of a screwdriver or the like. It will be readily appreciated that rather than using a head 44 we could provide shaft 38 with a knob or a thumbpiece or the like.

From the structure thus far described it will be apparent that shaft 38 can be moved to pass pin 42 through opening 22 and through the body 12 to a position at which the ends of the cross-pin 42 are at the beginning of the cam tracks 24 and 26. Our fastener assembly 36 includes a compound flat spring indicated generally by the reference character 48. Spring 48 which may be formed of any suitable material such, for example, as carbon steel, includes co-axial loops 50 and 52 which connect the spring legs 54 and 56. Legs 54 and 56 have respective openings 58 and 60 through which shaft 38 passes.

Referring now to FIGURE 4, we have shown a modified form of our improved fastener which is especially adapted to secure a cable or hose or the like to a wall. In the particular installation illustrated in FIGURE 4 an electrical cable 62 carries a clamp 64 of a type known in the art which is around the cable and which has a pair of lugs 66 and 68 provided with registering openings 70 and 72. In the normal use of the clamps 64 they are passed around the cable and a suitable fastener such as a nut and bolt or a rivet passes through the openings 70 and 72 and secures the clamp 64 to the wall 74 on which the cable is to be mounted. In the form of our improved fastener shown in FIGURE 4, rather than securing the clamp 64 directly to the wall 74 we employ a fastener assembly indicated generally by the reference character 76 which cooperates with a receptacle 10 secured to the wall 74. The assembly 76 differs from the assembly 36 shown in FIGURES 1 to 3 in that one of the spring legs, such, for example, as the leg 57, is formed with an extension 78 provided with an opening 80. In the installation illustrated in FIGURE 4 a bolt 82 passes through openings 70 and 72 and through the opening 80 and a nut 84 is turned on the bolt to secure the clamp 64 to the extension 78 of the spring leg 57. When this has been done, the fastener assembly 76 is secured in the receptacle 10. It will readily be understood that along the length of the cable 62 as many assembles 76 are provided as are necessary to cause the cable to follow the desired path. When the cable is removed the receptacle openings remain to define the path which the cable had followed so that it may readily be reinstalled in the same location.

In the use of the form of our fastener shown in FIGURES 1 to 3, the respective members 18 and 20 which are to be releasably secured in assembled relationship carry receptacle 10 and the fastener assembly 36. When the members are to be joined the shaft 38 is passed through opening 22 and through the body 12 to a position at which the ends of pin 42 are located adjacent the lower ends of the cam tracks 24 and 26. At this point spring 48 has little or no force exerted thereon. Once the parts have been so positioned head 44 is turned in a clockwise direction as viewed in FIGURE 3 to cause the ends of the pin 42 to move up the tracks 24 and 26 and into recesses 28 and 30. It will readily be appreciated that as this action takes place the spring 48 is compressed so that in the locked position of the parts illustrated in FIGURE 2 spring 48 firmly holds the pin ends in the recesses 28 and 30. In this locked position stops 32 and 34 prevent further appreciable rotation of shaft 38. If an attempt is made to rotate shaft 38 further it may rotate slightly but owing to the presence of legs 54 and 56 between the head 44 and member 20 only a very limited axial movement of shaft 38 is permitted. When the fastener is to be released shaft 38 is merely rotated in the opposite direction to bring the pin ends out of the recesses 28 and 30 and onto tracks 24 and 26 and spring 48 urges the pin down the tracks to a position at which it can be withdrawn through opening 22.

It use of the form of our fastener shown in FIGURE 4 as many clamps 64 as are necessary are placed around the cable 62 at spaced locations. When this has been done, a bolt 82 and a nut 84 are used to secure a fastener assembly 76 to each of the clamps 64. The wall 74 or the like along which the cable 62 is to extend carries as many receptacles 10 as there are assemblies 76. The receptacles are located along the path the cable is to follow. The cable can then be mounted along the wall 74 by securing an assembly 76 in each of the receptacles 10. If, for any reason, it is desired to remove the cable, the assemblies 76 can be detached from the receptacles 10 in a rapid and expeditious manner. Then, the cable 62 can be reinstalled in exactly the same position as that which it formerly occupied.

It will be seen that we have accomplished the objects of our invention. We have provided an improved quarter-turn fastener which overcomes the difficulties of quarter-turn fasteners of the prior art. Our fastener has fewer parts than do fasteners of the prior art. It is simple and inexpensive to construct. Our fastener is especially adapted for use in installing a cable or hose or the like on a wall so as to permit it to be readily removed and reinstalled in the same location.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A fastener for joining two members in assembled relationship, said members having openings therein, including in combination, a receptacle having an opening therein, said receptacle being provided with a recess and with a cam track leading into said recess, means mounting said receptacle on one side of one of said members with the receptacle opening aligned with the member opening, a shaft carried by the other of said members in the other member opening for rotary and for axial movement, a cross pin on said shaft adapted to engage said cam track, a head on said shaft, and a spring comprising a pair of legs connected by spaced biasing loops for urging said legs apart, said spring legs being disposed between the other member and said shaft head for biasing said cross pin into engagement with said cam track and for resiliently retaining said pin in said recess.

2. A fastener as in claim 1 in which portions of said loops are tapered in the direction of one of said legs.

3. A fastener for joining two members in assembled relationship, said members having openings therein, including in combination a receptacle having an opening therein, said receptacle being provided with a recess and with a cam track leading into said recess, means mounting said receptacle on one side of one of said members with the receptacle opening aligned with the member opening, a shaft carried by the other of said members in the other member opening for rotary and for axial movement, a cross pin on said shaft adapted to engage said cam track, a head on said shaft, and a spring comprising a pair of free generally straight legs biased apart by a loop having a curvature appreciably greater than 180° for urging said legs apart, said spring legs being disposed between the other member and said shaft head for biasing said cross pin into engagement with said cam surface and for resiliently retaining said pin in said recess.

References Cited by the Examiner

UNITED STATES PATENTS

| | | | |
|---|---|---|---|
| 1,772,835 | 8/1930 | Jurad | 85—5 |
| 1,793,745 | 2/1931 | Norwood | 151—34 |
| 2,352,823 | 7/1944 | Ellinwood | 248—74 |
| 2,396,925 | 3/1946 | Morehouse | 248—68 |
| 2,405,925 | 8/1946 | Poupitch | 151—38 |
| 2,684,516 | 7/1954 | Zahodiakin | 24—221 |

FOREIGN PATENTS 397,790    8/1933    Great Britain.

DONLEY J. STOCKING, *Primary Examiner.*